United States Patent
Sugaya

(10) Patent No.: US 10,621,332 B2
(45) Date of Patent: Apr. 14, 2020

(54) COMPUTER SYSTEM, IOT DEVICE MONITORING METHOD, AND PROGRAM

(71) Applicant: OPTiM Corporation, Saga-shi (JP)

(72) Inventor: Shunji Sugaya, Tokyo (JP)

(73) Assignee: OPTIM CORPORATION, Saga-Shi (JP)

(*) Notice: Subject to any disclaimer, the term of this patent is extended or adjusted under 35 U.S.C. 154(b) by 0 days.

(21) Appl. No.: 15/575,918

(22) PCT Filed: Nov. 30, 2016

(86) PCT No.: PCT/JP2016/085569
§ 371 (c)(1),
(2) Date: Nov. 21, 2017

(87) PCT Pub. No.: WO2018/100682
PCT Pub. Date: Jun. 7, 2018

(65) Prior Publication Data
US 2019/0278904 A1    Sep. 12, 2019

(51) Int. Cl.
*G06F 21/46* (2013.01)
*G06F 21/55* (2013.01)
(Continued)

(52) U.S. Cl.
CPC .............. *G06F 21/46* (2013.01); *G06F 21/31* (2013.01); *G06F 21/50* (2013.01); *G06F 21/55* (2013.01);
(Continued)

(58) Field of Classification Search
CPC .......... G06F 21/46; G06F 21/55; G06F 21/31; G06F 21/50; H04L 63/083; H04L 63/1441; H04W 12/08; G06N 20/00
See application file for complete search history.

(56) References Cited

U.S. PATENT DOCUMENTS

2010/0192205 A1* 7/2010 Chaudhry .............. G06F 21/31
726/5
2011/0141276 A1* 6/2011 Borghei ................ H04W 12/08
348/143
(Continued)

FOREIGN PATENT DOCUMENTS

| JP | 2007-200211 | 8/2007 |
| JP | 2010-220017 | 9/2010 |
| JP | 2012-37948 | 2/2012 |

OTHER PUBLICATIONS

Jujiwara, JP2012037948, Dec. 23, 2012, pp. 1-4. (Year: 2012).*
(Continued)

*Primary Examiner* — Luu T Pham
*Assistant Examiner* — Canh Le
(74) *Attorney, Agent, or Firm* — Lex IP Meister, PLLC

(57) ABSTRACT

A computer system, an IoT device monitoring method, and a program in which a security is improved are provided. A computer system for monitoring a connected IoT device 100 monitors a login state of the IoT device 100, detects an unauthorized access based on a result of the monitoring, learns any one or both of an ID or a password of the detected unauthorized access, and determines whether any one or both of an ID and a password held in advance by the IoT device 100 are easy to be released.

7 Claims, 10 Drawing Sheets

(51) Int. Cl.
  *H04L 29/06* (2006.01)
  *H04W 12/08* (2009.01)
  *G06F 21/50* (2013.01)
  *G06F 21/31* (2013.01)
  *G06N 20/00* (2019.01)

(52) U.S. Cl.
  CPC ........ *H04L 63/083* (2013.01); *H04L 63/1441* (2013.01); *H04W 12/08* (2013.01); *G06N 20/00* (2019.01)

(56) References Cited

U.S. PATENT DOCUMENTS

| | | | |
|---|---|---|---|
| 2011/0225638 A1* | 9/2011 | Nahari | G06F 21/46 726/7 |
| 2013/0046656 A1* | 2/2013 | Koskelainen | G06Q 20/02 705/26.41 |
| 2014/0282948 A1* | 9/2014 | Anson | G06F 21/46 726/6 |
| 2014/0337941 A1* | 11/2014 | Kominar | G06F 21/45 726/6 |
| 2014/0373088 A1* | 12/2014 | Aggarwal | G06F 21/46 726/1 |
| 2015/0067760 A1* | 3/2015 | Waltermann | G06F 21/6218 726/1 |
| 2015/0193615 A1* | 7/2015 | Hosoda | G06F 21/31 726/18 |
| 2016/0294802 A1* | 10/2016 | Xiao | H04L 63/083 |

OTHER PUBLICATIONS

YongNyuo Shin et al., "Designing fingerprint-recognition-based access control for electronic medical records systems," 2008 IEEE, pp. 106-110. (Year: 2008).*

Md. Tanvir Rahman et al,. "Trusted Device along with Trusted Location and Biometry based Authentication Method," Sep. 2016, pp. 26-30. (Year: 2016).*

* cited by examiner

COMPUTER SYSTEM, IOT DEVICE MONITORING METHOD, AND PROGRAM

TECHNICAL FIELD

The present invention relates to a computer system, an IoT device monitoring method, and a program that monitor a connected IoT device.

BACKGROUND ART

In recent years, the number of IoT (Internet of Things) devices connected to a LAN (Local Area Network) is increasing. A user can log in to the IoT device and use various functions of the IoT device, by inputting an ID or a password to a predetermined terminal.

When the user logs in to the IoT device, a problem arises in that the IoT device which the user does not intend to use is used by an unauthorized access of another user.

As a system for preventing such unauthorized access, for example, in a case where action plan information is prepared in advance and location information of a monitoring target device does not match with the action plan information, it is disclosed that the device is set to a locked state so that the unauthorized user cannot use the target device even after a password is leaked.

PRIOR ART DOCUMENT

Patent Document

Patent Document 1: Japanese Patent Application Publication No. 2010-220017

SUMMARY OF THE INVENTION

Technical Problem

However, in the configuration of Patent Document 1, it is impossible to determine whether such a password was easily broken, as a countermeasure after the leakage of the password of the IoT device.

It is an object of the present invention to provide a computer system, an IoT device monitoring method, and a program in which a security is improved.

Technical Solution

The present invention provides the following solutions.

The present invention provides a computer system for monitoring a connected IoT device. The computer system includes a monitoring unit that monitors a login state of the IoT device, a detecting unit that detects an unauthorized access based on a result of the monitoring, a learning unit that learns any one or both of an ID or a password of the detected unauthorized access, and a determining unit that determines whether any one or both of an ID and a password held in advance by the IoT device are easy to be released.

According to the present invention, a computer system monitoring a connected IoT device monitors a login state of the IoT device, detects an unauthorized access based on a result of the monitoring, learns any one or both of an ID or a password of the detected unauthorized access, and determines whether any one or both of an ID and a password held in advance by the IoT device are easy to be released.

The present invention relates to a computer system, but exhibits the same operations and effects even when being applied to other categories such as an IoT monitoring method, a program, and the like.

Effects of the Invention

According to the present invention, a computer system, an IoT device monitoring method, and a program in which a security is improved can be provided.

DETAILED DESCRIPTION OF THE EMBODIMENTS

Hereinafter, embodiments for carrying out the present invention are described with reference to the drawings. It is to be understood that the embodiments are merely examples and the scope of the present invention is not limited to the disclosed embodiments.

[Overview of IoT Device Monitoring System 1]

Figure 1:
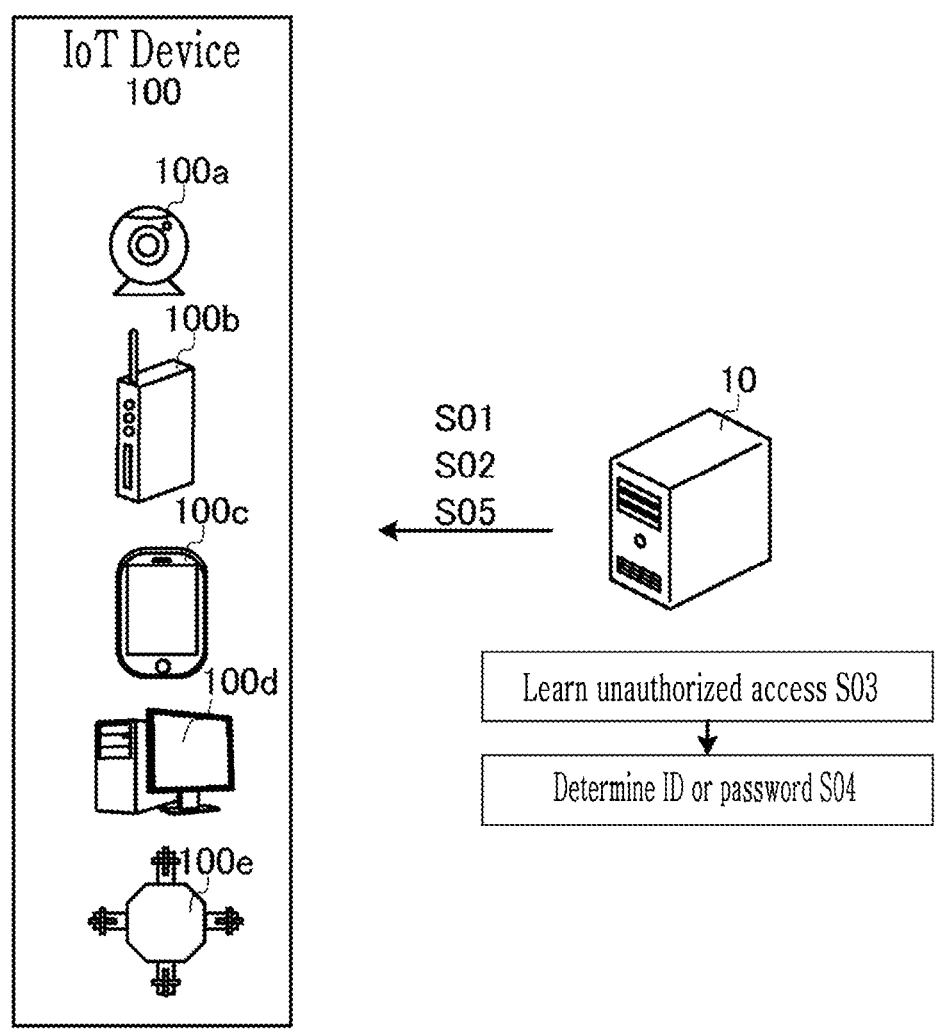
FIG. 1 is a diagram for explaining an overview of an IoT device monitoring system 1.

An overview of an embodiment of the present invention is described with reference to FIG. 1. FIG. 1 is a diagram for explaining an overview of an IoT device monitoring system 1 which is an embodiment of the present invention. The IoT device monitoring system 1 includes a computer 10 and IoT devices 100 (a network camera 100a, a sensor device 100b, a mobile terminal 100c, a computer device 100d, and a drone 100e), and is a computer system that monitors the IoT devices 100 connected to the computer 10.

In FIG. 1, the number of computer(s) 10 and the number of IoT devices 100 may be appropriately changed. In addition, types of the IoT devices 100 may be appropriately changed. Further, the computer 10 and the IoT devices 100 are not limited to existing devices, and may be virtual devices. Furthermore, each process to be described below may be realized by any one of the computer 10 and the IoT devices 100 or a combination of two or more of the computer 10 and the IoT devices 100.

The computer 10 is a computer device that is connected to the IoT devices 100 so as to perform data communication with the IoT devices 100. The computer 10 may be a network device such as a router that connects with the IoT devices 100 via a LAN.

The IoT devices 100 are terminal devices that are connected to the computer 10 so as to perform data communication with the computer 10. The IoT devices 100 are, for example, a network camera 100a that captures images such as moving images and still images, a sensor device 100b that acquires spatial data such as sunshine, temperature, and wind power, and environment data such as time data, a mobile terminal 100c and computer device 100d that are electric appliances such as a mobile phone, a portable information terminal, a tablet terminal, a personal computer, a netbook terminal, a slate terminal, an electronic dictionary terminal, a portable music player, or the like, a drone 100e such as an unmanned aerial vehicle, an unmanned mobile unit, or the like, and other goods.

First, the computer 10 monitors login states of the IoT devices 100 (step S01). The login state is a state in which one or both of an ID and a password are released.

The computer 10 detects an unauthorized access based on the result of monitoring (step S02). The unauthorized access means a state in which, even though the number of past input errors of the ID or the password is within a predetermined number of times (for example, three times), the ID or the password has been inputted the predetermined number of times or more and either the ID or the password is released.

The computer 10 learns both or either of the ID and/or the password of the detected unauthorized access (step S03). For example, the computer 10 learns combinations of IDs or passwords that are frequently used for the unauthorized access as a teacher data, and learns combinations of IDs or passwords that have been illegally accessed this time.

The computer 10 determines whether both or either of an ID and/or an password that is stored in advance by an IoT device 100 different from the IoT device 100 to which the unauthorized access has been performed at this time is likely to be released (step S04). For example, the computer 10 determines that it is easy to be released if an ID or a password that is the same as or similar to the above-described teacher data is stored, and otherwise determines that it is difficult to be released.

Upon determining that it is easy to be released, the computer 10 sets both or either of a new ID and/or a new password for this IoT device 100, differently from the both or either of the ID and/or the password that is stored in advance by this IoT device 100 (step S05).

The above is the overview of the IoT device monitoring system 1.

[System Configuration of IoT Device Monitoring System 1]

Figure 2:
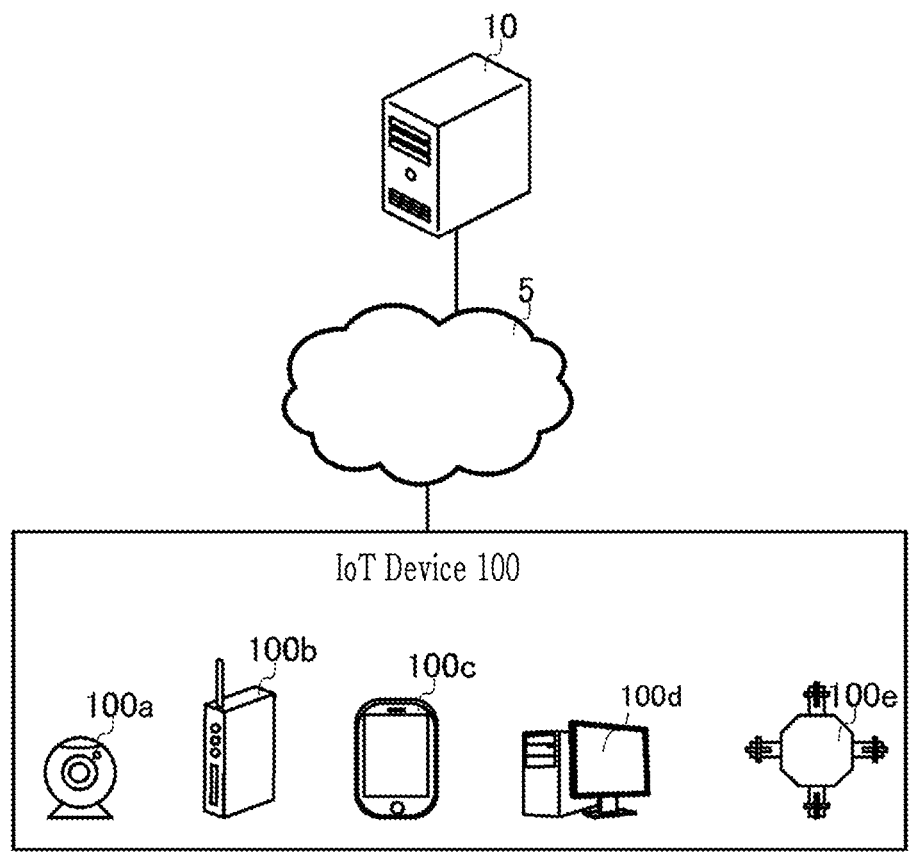
FIG. 2 is a diagram showing a system configuration of an IoT device monitoring system 1.

A system configuration of an IoT device monitoring system 1 which is an embodiment of the present invention is described with reference to FIG. 2. FIG. 2 is a diagram showing a system configuration of an IoT device monitoring system 1 which is an embodiment of the present invention. The IoT device monitoring system 1 includes a computer 10, IoT devices 100 (a network camera 100a, a sensor device 100b, a mobile terminal 100c, a computer device 100d, and a drone 100e), and a public line network 5 (an Internet network, a third or fourth generation communication network, etc.), and is a computer system for monitoring the IoT devices 100 connected to the computer 10.

The number and types of the devices constituting the IoT device monitoring system 1 may be appropriately changed. In addition, the IoT device monitoring system 1 may be realized not only by existing devices but also by virtual devices. Further, each process to be described later may be realized by any one or a combination of two or more of devices constituting the IoT device monitoring system 1. Furthermore, the computer 10 may be a network device such as a router that connects with the IoT devices 100 via a LAN.

The computer 10 is the above-described computer device having functions to be described below.

The IoT device 100 is the above-described terminal device having functions to be described below.

[Description of Each Function]

Figure 3:
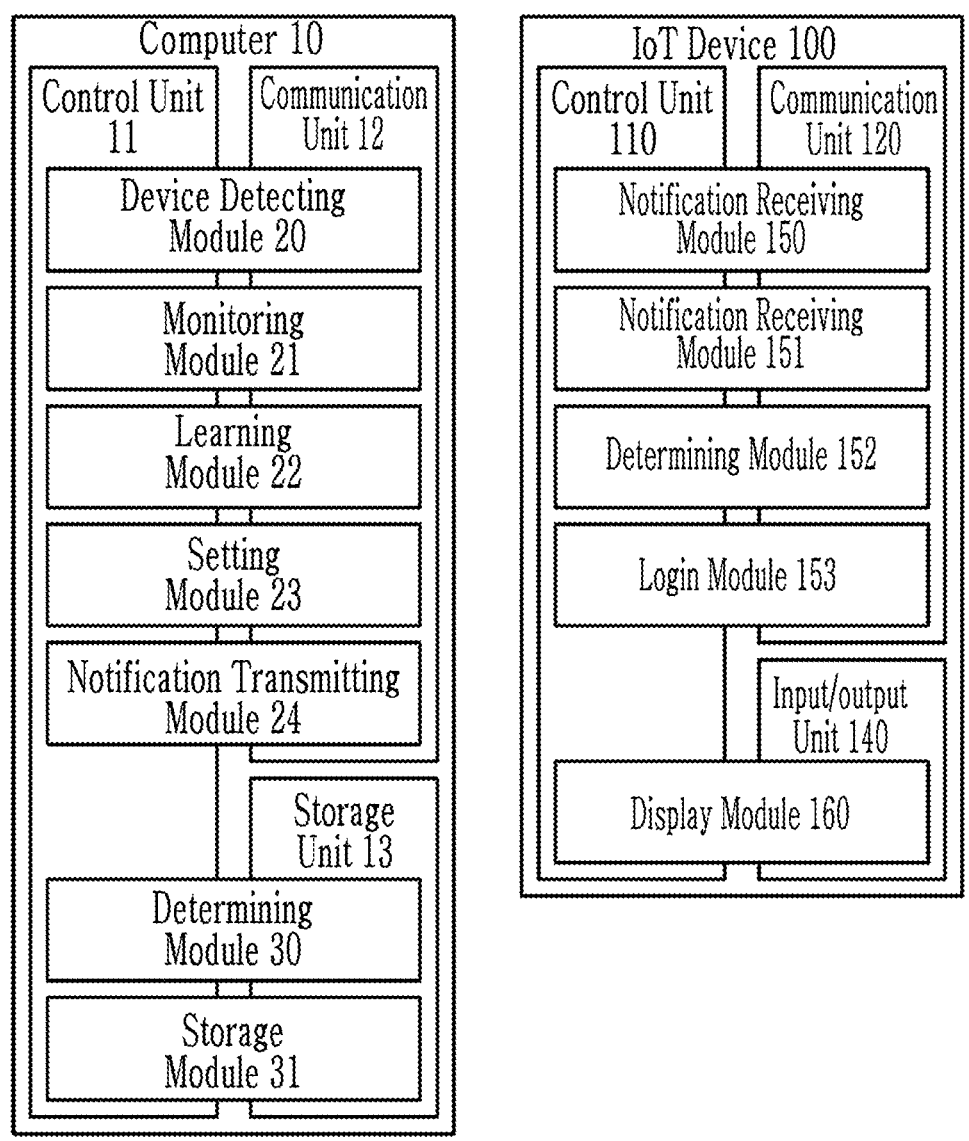
FIG. 3 is a functional block diagram of a computer 10 and an IoT device 100.

Functions of an IoT device monitoring system 1 which is an embodiment of the present invention are described with reference to FIG. 3. FIG. 3 is a functional block diagram of a computer 10 and an IoT device 100.

The computer 10 includes, as a control unit 11, a CPU (Central Processing Unit), a RAM (Random Access Memory), a ROM (Read Only Memory), and the like. The computer 10 includes, as a communication unit 12, a device, for example a WiFi (Wireless Fidelity) compliant device conforming to IEEE 802.11 or the like, for enabling communication with other devices. In addition, the computer 10 includes, as a storage unit 13, a data storage device such as a hard disk, a semiconductor memory, a recording medium, a memory card, or the like.

In the computer 10, the control unit 11 reads a predetermined program, thereby realizing a device detecting module 20, a monitoring module 21, a learning module 22, a setting module 23, and a notification transmitting module 24, in cooperation with the communication unit 12. In addition, in the computer 10, the control unit 11 reads a predetermined program, thereby realizing a determining module 30 and a storage module 31 in cooperation with the storage unit 13.

Like the computer 10, the IoT device 100 includes a CPU, a RAM, a ROM, and the like as a control unit 110, and includes a device that enables communication with other devices as a communication unit 120. Further, the IoT device 100 includes, as an input/output unit 140, a display unit for outputting and displaying data and images controlled by the control unit 110, an input unit, such as a touch panel, a keyboard, and a mouse, for accepting an input from the user, an imaging unit for capturing images such as moving images and still images, various devices for acquiring environmental data and executing various processes, and the like.

In the IoT device 100, the control unit 110 reads a predetermined program, thereby realizing a notification receiving module 150, a data transmitting/receiving module 151, a determining module 152, and a login module 153, in cooperation with the communication unit 120. In addition, in the IoT device 100, the control unit 110 reads a predetermined program, thereby realizing a display module 160 in cooperation with the input/output unit 140.

[IoT Device Monitoring Process]

Figure 4:
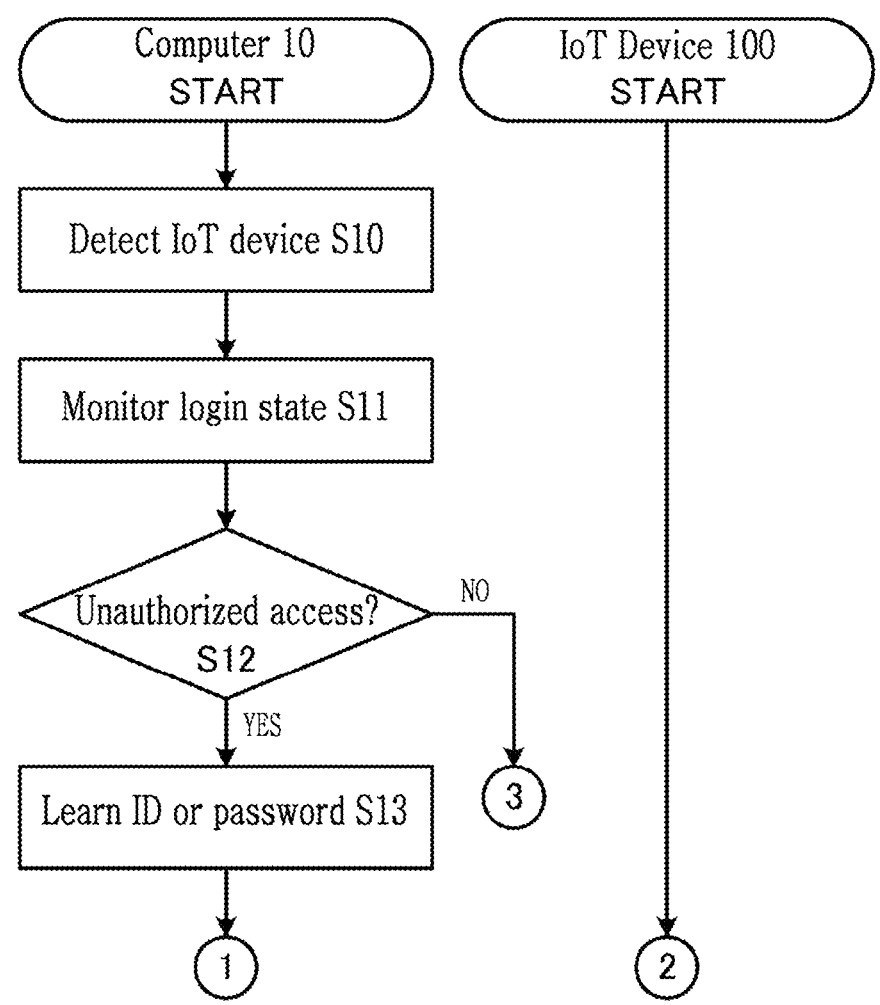
FIG. 4 is a flowchart showing an IoT device monitoring process executed by a computer 10 and an IoT device 100.
Figure 5:
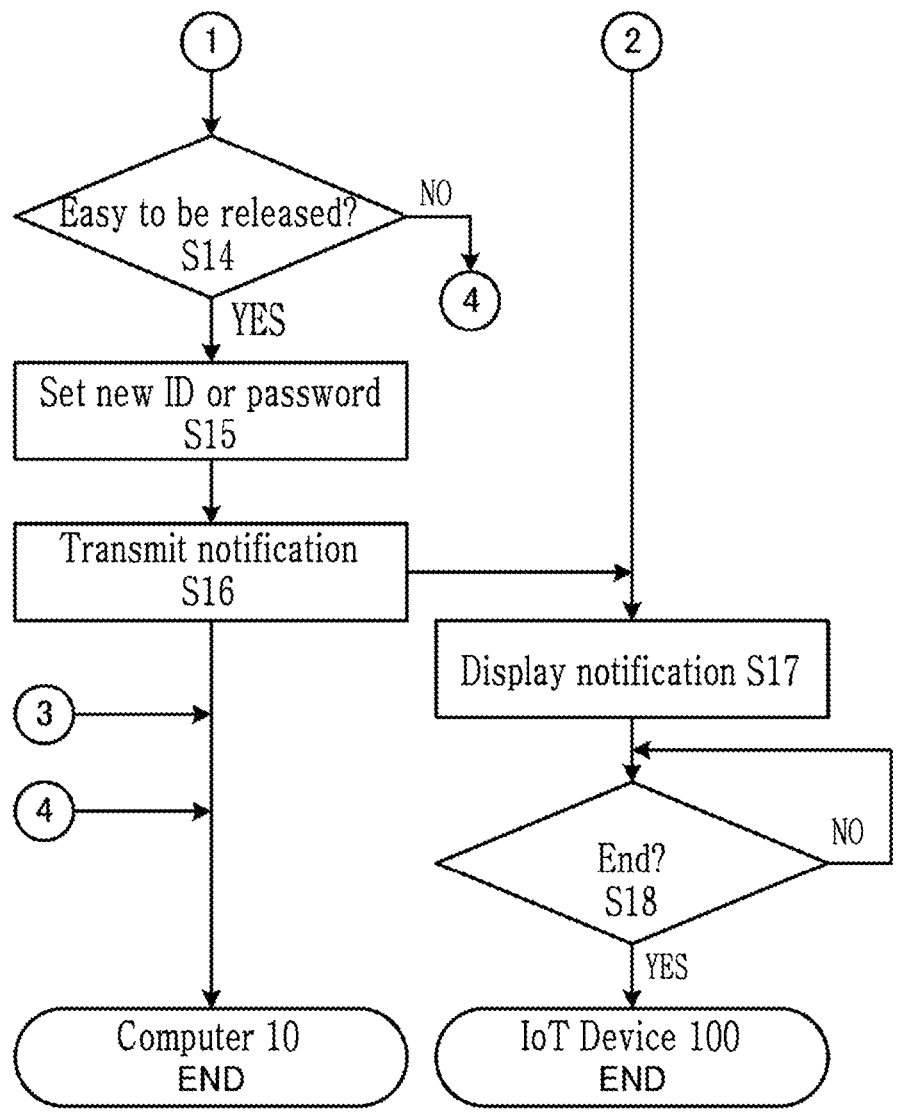
FIG. 5 is a flowchart showing an IoT device monitoring process executed by a computer 10 and an IoT device 100.

An IoT device monitoring process executed by an IoT device monitoring system 1 is described with reference to FIG. 4 and FIG. 5. FIG. 4 and FIG. 5 are flowcharts showing an IoT device monitoring process executed by a computer 10 and an IoT device 100. The process executed by the modules of each device described above is described in conjunction with the present process.

A device detecting module 20 detects an IoT device 100 connected to the device detecting module 20 (step S10). In step S10, the device detecting module 20 detects the IoT device 100 that is connected to the device detecting module 20 via a LAN or WAN. In the present embodiment, the device detecting module 20 detects a network camera 100a, a sensor device 100b, a mobile terminal 100c, a computer device 100d, and a drone 100e as the IoT devices 100.

A monitoring module 21 monitors a login state of the detected IoT device 100 (step S11). In step S11, the login state means a state in which both or any one of an ID and a password of the IoT device 100 are released. The monitoring module 21 monitors whether the IoT device 100 is in the login state.

The monitoring module 21 determines whether an unauthorized access has been detected based on the monitoring result (step S12). In step S12, the monitoring module 21 detects the unauthorized access based on a fact that inputs are accepted the number of times exceeding the number of past input errors of the ID or the password and both or any one of the ID and the password have been released. For example, even though the number of past input errors of the ID or the password is within three times), the monitoring module 21 detects the unauthorized access in a case where the ID or the password has been, this time, inputted five times exceeding the three times and, as a result, both or any one of the ID and the password has been released.

The monitoring module 21 may detect the unauthorized access by any other method. For example, the unauthorized access may be detected in a case where a login different from the normal login is accepted, such as a case where the login is performed from location information different from location information where the login is normally performed, a case where the login is performed at a time zone different from a time zone when the login is normally performed, or a case where the login is performed in a terminal different from a terminal in the login is normally performed.

In step S12, when the unauthorized access is not detected (NO in step S12), the monitoring module 21 ends the present process.

On the other hand, in step S12, when the monitoring module 21 detects the unauthorized access (YES in step S12), a learning module 22 learns any one or both of the ID and the password for which the detected unauthorized access has been performed (step S13). In step S13, the learning module 22 learns, as teacher data, IDs or passwords that are frequently used for unauthorized accesses and the ID or the passwords for which the unauthorized accesses has been performed this time. The ID or passwords that are frequently used for the unauthorized access are those at the initial setting (the ID is "admin" and the password is "admin", the ID is "user" and the password is "user", etc.), the same those in the plurality of IoT devices and the like, those with the same character string ("0000", "1111", "AAAA", etc.), those with consecutive alphanumeric characters ("1234", "5678", "ABCD", "abc123", etc.), those without an uppercase letter, a lowercase letter, an alphanumeric character, and a symbol being combined, those generated by pressing keys of a keyboard in order ("qwerty", "poiuy", etc.), those with simple names only ("yamada", "satou", etc.), or those with a simple word registered in the dictionary ("apple", "sample", etc).

The determining module 30 determines whether both or any one of the ID and the password, which are stored in the storage module 31 in advance by an IoT device 100 different from the IoT device 100 in which the unauthorized access has been detected this time, are easy to be released (Step S14). In step S14, the determining module 30 determines whether both or any one of the ID and the password are easy to be released, based on whether the ID or password held by the storage module 31 matches with an ID or password that is frequently used for the above-described unauthorized access, whether a matching rate with such an ID or password is higher than a predetermined value, whether the ID or password held by the storage module 31 matches with an ID or password used for the unauthorized access, and the like.

In step S14, upon determining that it is difficult to be released (NO in step S14), the determining module 30 ends the present process. In addition, when determining that it is difficult to be released, the determining module 30 may transmit a notification to a terminal possessed by the user, the mobile terminal 100c, or the computer device 100d. The terminal, the mobile terminal 100c, and the computer device 100d may display this notification.

On the other hand, in step S14, when the determining module 30 determines that it is easy to be released (YES in step S14), the setting module 23 set a new ID or password, which is different from the ID or password of the IoT device 100 held by the storage module 31, for this IoT device 100 (step S15). In step S15, the setting module 23 sets the new ID or password in addition to the held ID or password. That is, two IDs or passwords are set to the IoT device 100. At this time, the setting module 23 sets the ID or password which is difficult to match with the IDs or passwords that are frequently used for the above-described unauthorized access. Further, the setting module 23 sets the ID or password in consideration of user's convenience. For example, the setting module 23 may insert alphanumeric characters to a part of the original ID or password, insert alphanumeric characters at any one or both of the beginning and the end of the ID or password, or combine them, thereby setting the ID or password that is difficult to match with the IDs or passwords frequently used for the unauthorized access. For example, when the original ID is "yamada", the setting module 23 sets the ID to "01yama02da". Similarly, when the original password is "tarou", the setting module 23 sets the password to "ta05r12ou".

In addition, the ID or password set by the setting module 23 is not limited to the above-described examples and may be changed as appropriate.

A notification transmitting module 24 transmits a notification indicating that the new ID or password has been set to the IoT device 100 (step S16). In step S16, this notification is transmitted to the mobile terminal 100c or the computer device 100d that has a display unit, an input/output unit, or the like as the IoT device 100. In addition, the notification transmitting module 24 may transmit this notification to a terminal devices or the like possessed by other users.

A notification receiving module 150 receives the notification. A display module 160 displays an additional notification screen based on this notification (step S17).

Figure 8:
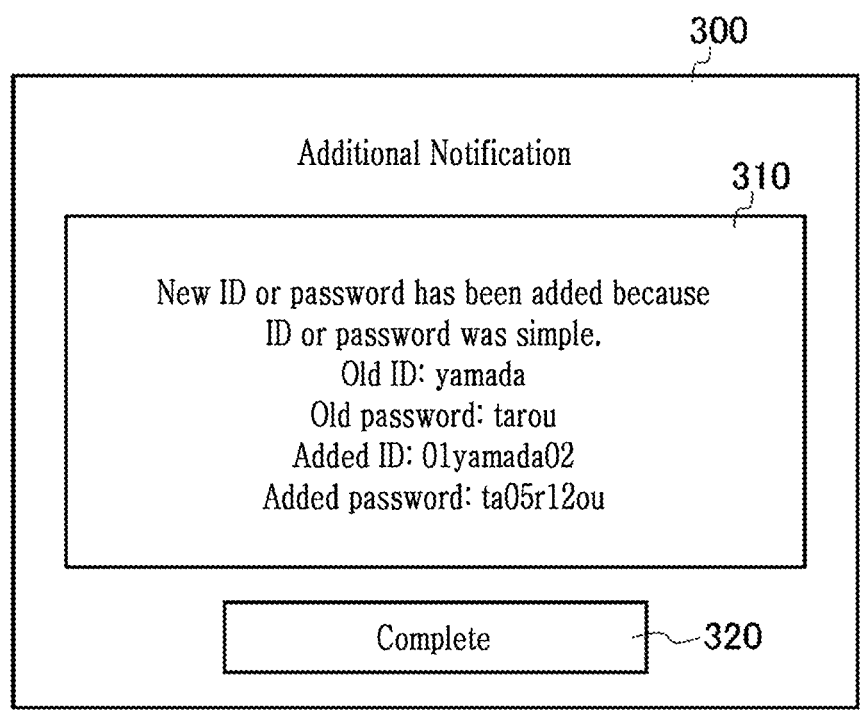
FIG. 8 is a diagram showing an example of an additional notification screen.

The additional notification screen displayed by the display module 160 is described with reference to FIG. 8. FIG. 8 is a diagram showing an example of the additional notification screen. The display module 160 displays an additional content display area 310 and a completion icon 320 as the additional notification screen 300. The additional content display area 310 is an area for displaying a reason for adding an ID or password, an ID or password before the addition, and an ID or password after the addition. The display module 160 displays "a new ID or password has been added because the ID or password was simple" as the reason for addition. The display module 160 displays, as the reason for addition, that the addition has been made based on the content that is frequently used for the unauthorized access described above. The display module 160 displays "old ID: yamada" as the ID before the addition and displays "old password: tarou" as the password before the addition. The display module 160 displays "01yamada02" as the added ID and displays "ta05r12ou" as the added password. The completion icon 320 terminates this screen by receiving an input from the user.

The display module 160 determines whether an input for ending the display of the additional notification screen is received (step S18). In step S18, when determining that the input is not received (NO in step S18), that is, when determining that the input of the completion icon 320 is not received, the display module 160 repeats the present process.

On the other hand, in step S18, when determining that the input is received (YES in step S18), that is, when the input of the completion icon 320 is received, the display module 160 ends the present process.

The above is the IoT device monitoring process.

[IoT Device Login Process]

Figure 6:
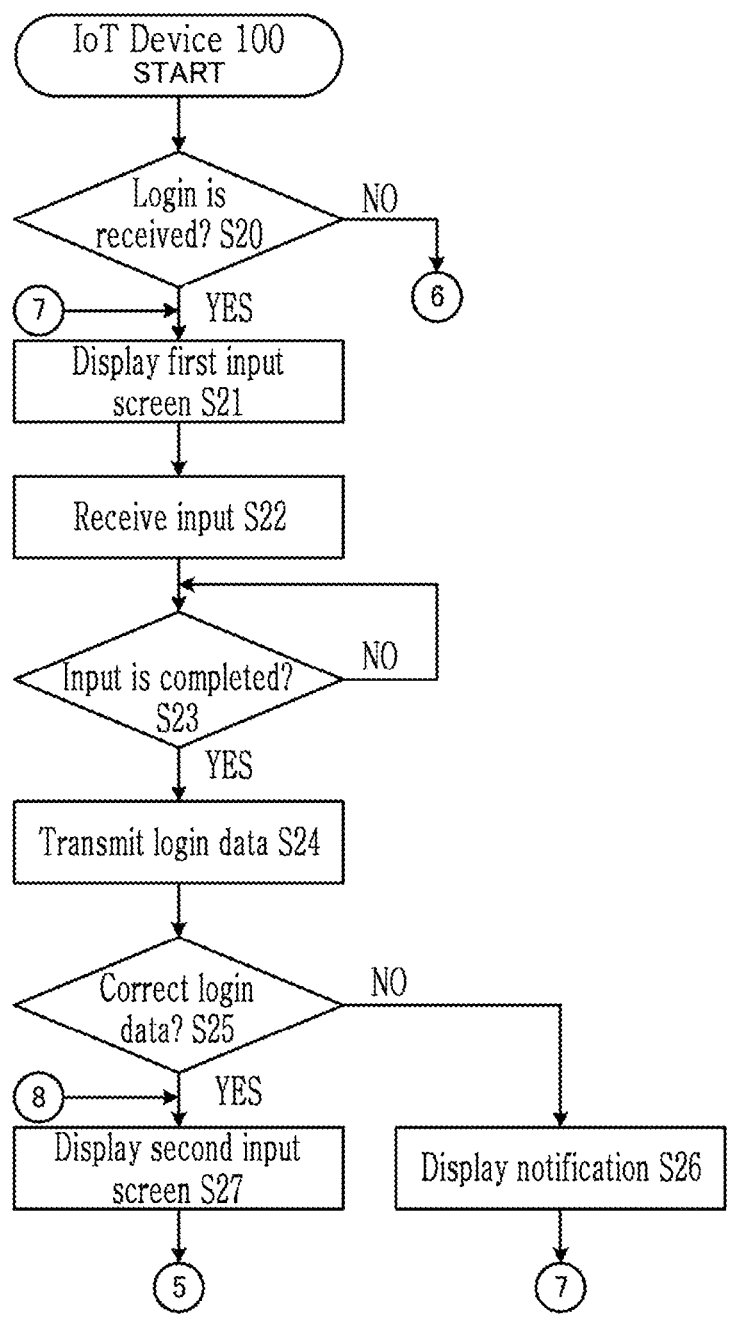
FIG. 6 is a flowchart showing an IoT device login process executed by an IoT device 100.
Figure 7:
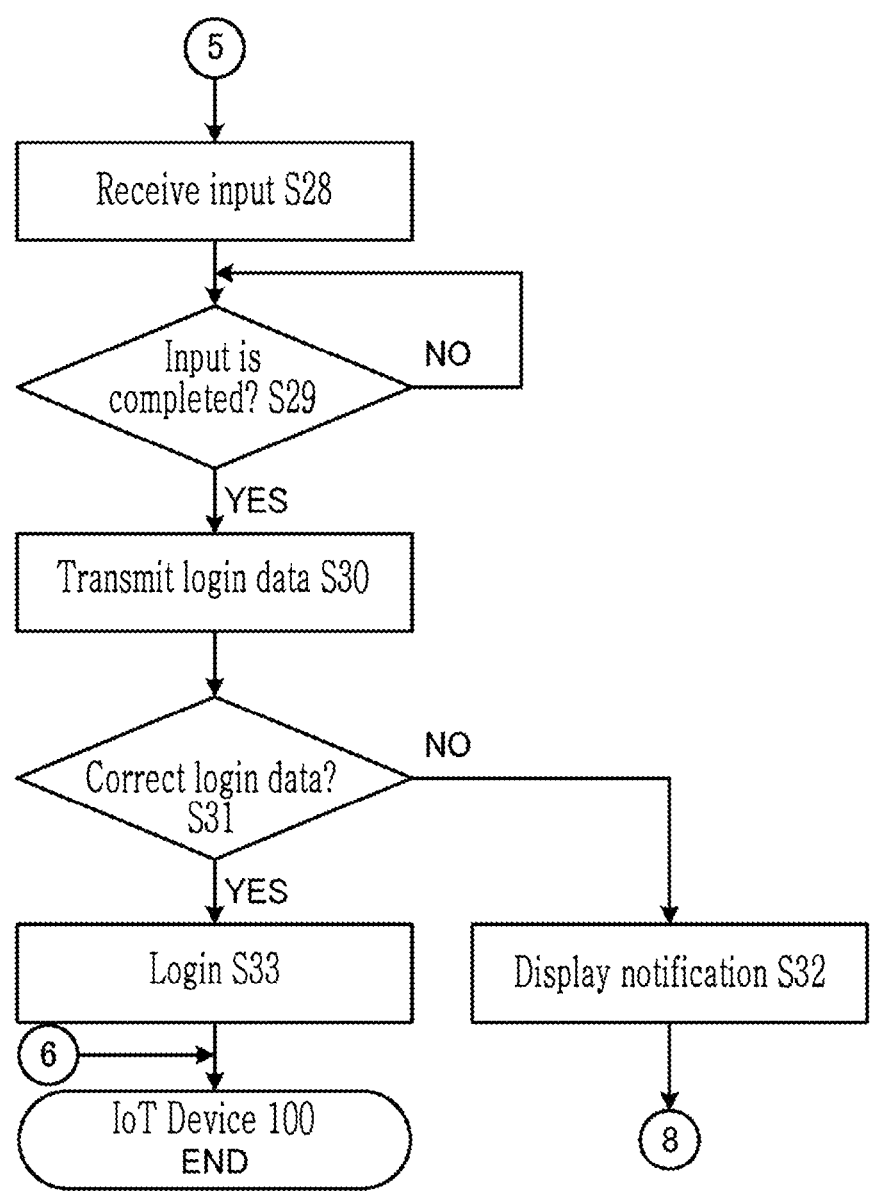
FIG. 7 is a flowchart showing an IoT device login process executed by an IoT device 100.

An IoT device login process executed by an IoT device monitoring system 1 is described with reference to FIG. 6 and FIG. 7. FIG. 6 and FIG. 7 are flowcharts showing an IoT device login process executed by an IoT device 100. The process executed by each module described above is described in conjunction with the present process.

A display module 160 determines whether an input of login to an IoT device 100 is received (step S20). In step S20, the display module 160 receives the input of login to the IoT device 100 by activating a dedicated application, a web browser, or the like.

In step S20, when the display module 160 determines that the input is not received (step S20 NO), the display module 160 ends the present process.

On the other hand, in step S20, when the display module 160 determines that the input is received (YES in step S20), the display module 160 displays a first input screen (step S21).

Figure 9:
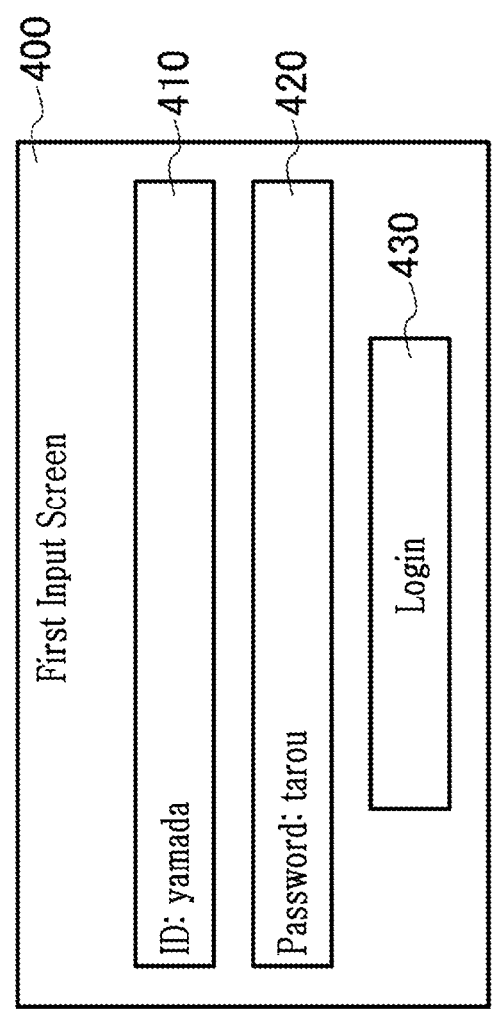
FIG. 9 is a diagram showing an example of a first input screen.

The first input screen displayed by the display module 160 is described with reference to FIG. 9. FIG. 9 is a diagram showing an example of the first input screen. The display module 160 displays an ID input area 410, a password input area 420, and a login icon 430, as the first input screen 400. The ID input area 410 receives an input from the user and is an area that receives an input of an ID. The password input area 420 receives an input from the user and is an area that receives an input of a password. The ID input area 410 and the password input area 420 may display a virtual keyboard as a trigger upon receiving an input from the user and receive an input from the user by receiving the input on the virtual keyboard. Alternatively, the ID input area 410 and the password input area 420 may receive the input from the user by a voice input or the like. The login icon 430 receives an input from the user, and a data transmitting/receiving module 151 transmits the inputted ID or password to a target IoT device 100 as a login data.

The display module 160 receives the input of the ID or password (step S22). In step S22, the display module 160 receives the input of the original ID or password. That is, in the present embodiment, "yamada" is inputted as the ID and "tarou" is inputted as the password.

The display module 160 determines whether the input is completed (step S23). In step S23, the display module 160 performs the determination based on whether the input of the login icon 430 is received.

In step S23, when determining that the input is not completed (NO in step S23), that is, when determining that the input of the login icon 430 is not received, the display module 160 repeats the present process.

On the other hand, in step S23, when the display module 160 determines that the input is completed (YES in step S23), that is, when the display module 160 determines that the input of the login icon 430 is received, the data transmitting/receiving module 151 transmits the received ID or password to the target IoT device 100 as the login data (step S24).

The data transmitting/receiving module 151 receives the login data. The determining module 152 determines whether the received login data is a correct login data (step S25). In step S25, the determining module 152 determines whether the ID and password included in the login data are correct. When determining that it is not the correct login data (NO in step S25), the determining module 152 counts an input error and transmits a notification of requesting to input the ID or password again to the IoT device 100. The display module 160 displays this notification (step S26), and repeats the processes from step S21 described above. Furthermore, when the determining module 152 counts the input error a predetermined number of times or more, the IoT device monitoring system 1 executes the IoT device monitoring process described above.

On the other hand, in step S25, when the determining module 152 determines that it is the correct login data (YES in step S25), the determining module 152 transmits a second input screen to the IoT device 100, and the display module 160 displays the second input screen (step S27).

Figure 10:
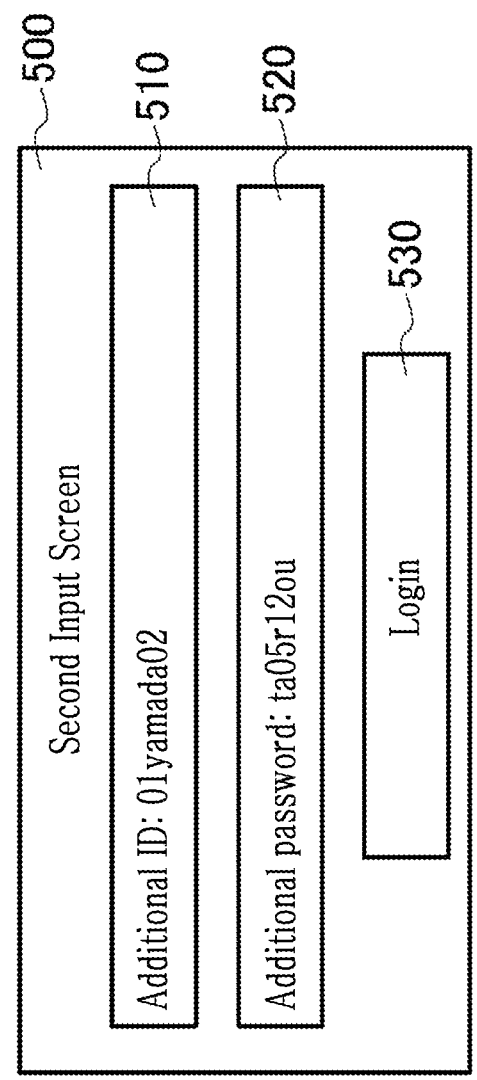
FIG. 10 is a diagram showing an example of a second input screen.

The second input screen displayed by the display module 160 is described with reference to FIG. 10. FIG. 10 is a diagram showing an example of the second input screen. The display module 160 displays an additional ID input area 510, an additional password input area 520, and a login icon 530, as the second input screen 500. The additional ID input area 510 receives an input from the user and is an area that receives an input of the ID set in the above-described process of step S15. Further, the additional password input area 520 receives an input from the user and is an area that receives an input of the password set in the above-described process of step S15. The additional ID input area 510 and the additional password input area 520 may display a virtual keyboard as a trigger upon receiving an input from the user and receive an input from the user by receiving the input on the virtual keyboard. Alternatively, the additional ID input area 510 and the additional password input area 520 may receive the input from the user by a voice input or the like. The login icon 530 receives an input from the user, and the data transmitting/receiving module 151 transmits, as a login data, the additional ID or the additional password that is received as the input to the target IoT device 100.

The display module 160 receives the input of the additional ID or password (step S28). In step S28, the display module 160 receives the input of the newly set ID or password. That is, in the present embodiment, "01yamada02" is inputted as the additional ID, and "ta05r12ou" is inputted as the additional password.

The display module 160 determines whether the input is completed (step S29). In step S29, the display module 160 performs the determination based on whether the input of the login icon 530 is received.

In step S29, when determining that the input is not completed (NO in step S29), that is, when determining that the input of the login icon 530 is not received, the display module 160 repeats the present process.

On the other hand, in step S29, when the display module 160 determines that the input is completed (YES in step S29), that is, when the display module 160 determines that the input of the login icon 530 is received, the data transmitting/receiving module 151 transmits the received additional ID or password to the target IoT device 100 as the login data (step S30).

The data transmitting/receiving module 151 receives the login data. The determining module 152 determines whether the received login data is a correct login data (step S31). In step S31, the determining module 152 determines whether the ID and password included in the login data are correct. The process of step S31 is the same as the process of step S25 described above. In step S31, when determining that it is not the correct login data (NO in step S31), the determining module 152 counts an input error and transmits a notification of requesting to input the ID or password again to the IoT device 100. The display module 160 displays this notification (step S32), and repeats the processes from step S27 described above. Furthermore, when the determining module 152 counts the input error a predetermined number of times or more, the IoT device monitoring system 1 executes the IoT device monitoring process described above.

On the other hand, in step S31, when the determining module 152 determines that it is the correct login data (YES in step S31), the login module 153 logs in to the IoT device 100 (step S33).

In addition, while it has been described in the above-described embodiment that the original ID or password is inputted on the first input screen and the newly set ID or password is inputted on the second input screen, the newly set ID or password may be inputted on the first input screen and the original ID or password may be inputted on the second input screen. That is, the input for allowing the new ID or password to be inputted may be received either before or after the login screen of the IoT device 100.

The above is the IoT device login process.

The means and functions described above are realized by reading and executing a predetermined program by a computer (including a CPU, an information processing device, and various terminals). The program is provided, for example, in a form (SaaS: software as a service) provided from the computer via a network. Further, the program is provided, for example, in a form recorded in a computer-readable recording medium such as a flexible disk, a CD (e.g., CD-ROM or the like), a DVD (DVD-ROM, DVD-RAM, or the like), or the like. In this case, the computer reads the program from the recording medium and transfers the program to an internal storage unit or an external storage unit to be stored and executed. Furthermore, the program may be recorded in advance in a storage device (recording medium) such as a magnetic disk, an optical disk, an optical magnetic disk, or the like and be provided from the recording medium to the computer through a communications line.

While the embodiments of the present invention have been described above, the present invention is not limited to the above-described embodiments. In addition, the effects described in the embodiments of the present invention are merely a list of the most preferable effects produced by the present invention, and the effects of the present invention are limited to those described in the embodiments of the present invention.

DESCRIPTION OF REFERENCE NUMBERS

1: IoT device monitoring system, 10: computer, 100: IoT device

What is claimed is:

1. A computer system for monitoring a connected Internet of Things (IoT) device, comprising:
a hardware processor configured to:
monitor a login state of the IoT device;
detect whether an unauthorized access has occurred based on a result of the monitoring, in response to monitoring a login state in which at least one of the ID or password of the IoT device is released and an access attempted for at least one of the ID or password of the IoT device satisfies a predetermined condition;
learn any one or both of an ID (Identifier) or a password of the detected unauthorized access by using IDs or passwords that are frequently used for an unauthorized access as a teacher data;
determine whether a matching rate between at least one of an ID and a password held in advance by the IoT device and at least one of the ID and password used for the detected unauthorized access is higher than a predetermined value;
set at least one of a new ID and a new password, which are different from the ID and password held in advance by the IoT device, for the IoT device when determining that the matching rate between the at least one of the ID and password held in advance and the at least one of the ID and password used for the detected unauthorized access is higher than the predetermined value; and
transmit, to the IoT device, a notification including the at least one of the new ID and new password, the at least one of the ID and password held in advance, and a reason for which the at least one of the new ID and new password is set, thereby allowing the IoT device to display the notification.

2. The computer system according to claim 1, wherein the processor, upon setting the new password, receives an input for allowing the new password to be inputted either before or after a login screen of the IoT device.

3. The computer system according to claim 1, wherein the processor sets the at least one of the new ID and new password by inserting a plurality of alphanumeric characters at a beginning, an end, or a part of at least one of the ID and password held in advance.

4. An Internet of Things (IoT) device monitoring method for monitoring a connected IoT device, comprising:
monitoring a login state of the IoT device;
detecting whether an unauthorized access has occurred based on a result of the monitoring in response to monitoring a login state in which at least one of the ID or password of the IoT device is released and an access attempted for at least one of the ID or password of the IoT device satisfies a predetermined condition;
learning any one or both of an ID (Identifier) or a password of the detected unauthorized access by using IDs or passwords that are frequently used for an unauthorized access as a teacher data;
determining whether a matching rate between at least one of an ID and a password held in advance by the IoT device and at least one of the ID and password used for the detected unauthorized access is higher than a predetermined value;
setting at least one of a new ID and a new password, which are different from the ID and password held in advance by the IoT device, for the IoT device when determining that a matching rate between the at least one of the ID and password held in advance and the at least one of the ID and password used for the detected unauthorized access is higher than the predetermined value; and
transmitting, to the IoT device, a notification including the at least one of the new ID and new password, the at least one of the ID and password held in advance, and a reason for which the at least one of the new ID and new password is set, thereby allowing the IoT device to display the notification.

5. The IoT device monitoring method according to claim 4, wherein setting the at least one of the new ID and new password processor includes setting the at least one of the new ID and new password by inserting a plurality of alphanumeric characters at a beginning, an end, or a part of at least one of the ID and password held in advance.

6. A program, stored on a non-transitory computer-readable medium, for causing a computer system that monitors a connected Internet of Things (IoT) device to execute:

monitoring a login state of the IoT device;

detecting whether an unauthorized access has occurred based on a result of the monitoring in response to monitoring a login state in which at least one of the ID or password of the IoT device is released and an access attempted for at least one of the ID or password of the IoT device satisfies a predetermined condition;

learning any one or both of an ID (Identifier) or a password of the detected unauthorized access by using IDs or passwords that are frequently used for an unauthorized access as a teacher data;

determining whether a matching rate between at least one of an ID and a password held in advance by the IoT device and at least one of the ID and password used for the detected unauthorized access is higher than a predetermined value;

setting at least one of a new ID and a new password, which are different from the ID and password held in advance by the IoT device, for the IoT device when determining that the matching rate between the at least one of the ID and password held in advance and the at least one of the ID and password used for the detected unauthorized access is higher than the predetermined value is easy to be released; and transmitting, to the IoT device, a notification including the at least one of the new ID and new password, the at least one of the ID and password held in advance, and a reason for which the at least one of the new ID and new password is set, thereby allowing the IoT device to display the notification.

7. The program according to claim 6, wherein setting the at least one of the new ID and new password processor includes setting the at least one of the new ID and new password by inserting a plurality of alphanumeric characters at a beginning, an end, or a part of at least one of the ID and password held in advance.

* * * * *